(12) United States Patent
Safreno

(10) Patent No.: US 8,608,404 B2
(45) Date of Patent: Dec. 17, 2013

(54) SMART SUSTAINABLE AGRICULTURAL/AQUACULTURAL SYSTEM AND METHODS

(76) Inventor: Douglas Steven Safreno, Woodside, CA (US)

( * ) Notice: Subject to any disclaimer, the term of this patent is extended or adjusted under 35 U.S.C. 154(b) by 530 days.

(21) Appl. No.: 12/846,122

(22) Filed: Jul. 29, 2010

(65) Prior Publication Data

US 2012/0029709 A1 Feb. 2, 2012

(51) Int. Cl.
*G05D 7/00* (2006.01)

(52) U.S. Cl.
USPC ............................................. 405/92; 700/281

(58) Field of Classification Search
USPC ................... 405/52, 80, 87, 92–95; 47/59 R; 119/224, 225, 269; 700/275, 281–284; 137/236.1
See application file for complete search history.

(56) References Cited

U.S. PATENT DOCUMENTS

| | | | |
|---|---|---|---|
| 3,338,057 A | 8/1967 | Eckstine | |
| 3,665,945 A * | 5/1972 | Ottenstein | 137/14 |
| 3,952,522 A | 4/1976 | Shettel | |
| 4,015,366 A * | 4/1977 | Hall, III | 47/1.43 |
| 4,102,136 A | 7/1978 | Winther | |
| 4,548,225 A | 10/1985 | Busalacchi | |
| 4,920,694 A | 5/1990 | Higa | |
| 5,038,715 A * | 8/1991 | Fahs, II | 119/224 |
| 5,372,456 A | 12/1994 | Langemann | |
| 5,735,076 A | 4/1998 | Masui et al. | |
| 5,947,057 A | 9/1999 | Perez et al. | |
| 6,000,880 A * | 12/1999 | Halus | 405/52 |
| 6,132,139 A | 10/2000 | Hashimoto et al. | |
| 6,427,718 B1 | 8/2002 | Stringam et al. | |
| 7,114,878 B2 | 10/2006 | Craig et al. | |
| 7,349,763 B2 * | 3/2008 | Ivans | 700/284 |
| 7,458,521 B2 * | 12/2008 | Ivans | 239/1 |
| 7,503,283 B2 * | 3/2009 | Abraham | 119/217 |
| 7,822,511 B2 * | 10/2010 | Ivans | 700/284 |
| 7,866,919 B2 * | 1/2011 | Miller | 405/80 |
| 2007/0283621 A1 | 12/2007 | Holloway | |
| 2008/0097653 A1 | 4/2008 | Kaprielian | |
| 2008/0119948 A1 * | 5/2008 | O'Connor | 700/9 |
| 2008/0253837 A1 * | 10/2008 | Miller | 405/80 |
| 2010/0222932 A1 * | 9/2010 | O'Connor | 700/284 |

FOREIGN PATENT DOCUMENTS

| | | |
|---|---|---|
| JP | 55002120 | 1/1980 |
| JP | 07087856 | 4/1995 |
| JP | 08056504 | 3/1996 |
| JP | 10042724 | 2/1998 |

(Continued)

OTHER PUBLICATIONS

International Search Report and Written Opinion of the International Searching Authority for PCT/US2011/044315 mailed Dec. 13, 2011.

(Continued)

*Primary Examiner* — Tara M. Pinnock
(74) *Attorney, Agent, or Firm* — Fitch, Even, Tabin & Flannery LLP

(57) ABSTRACT

An agricultural/aquacultural system for use with a plurality of growth reservoirs containing a fluid. The system involves a main control unit for receiving feedback and providing control, at least one pump control unit in electronic communication with the main control unit, and at least one gate control unit in electronic communication with the main control unit.

1 Claim, 10 Drawing Sheets

(56) References Cited

FOREIGN PATENT DOCUMENTS

| JP | 11050436 | 2/1999 |
| JP | 2002212935 | 7/2002 |
| JP | 2002315455 | 10/2002 |
| JP | 2005013202 | 1/2005 |
| JP | 2005046128 | 2/2005 |
| JP | 2005348695 | 12/2005 |
| JP | 2007028959 | 2/2007 |
| KR | 2009011073 | 2/2009 |
| SU | 432886 | 12/1974 |

OTHER PUBLICATIONS

Office Action from China Patent Office in Chinese Application No. 200780019052.1 mailed Jan. 13, 2012.

* cited by examiner

| SEGMENT | DAY | ADJUSTMENT TO COMPENSATE FOR AIR TEMPERATURE VARIATIONS | ADJUSTMENT FOR WATER TEMPERATURE VARIATIONS | ADJUSTMENT FOR WIND SPEED VARIATIONS | PUMP RATE SET-POINT | TARGET WATER LEVEL | TARGET GATE VERTICAL DISPLACEMENT | SPECIFIC INSTRUCTIONS |
|---|---|---|---|---|---|---|---|---|
| Preflooding | ~1–~4 | | | | Full "ON" Flow Position | ~0 in.–~4 in | | Set gate vertical displacement of last remote gate in the system at ~4 in. When such displacement reaches ~3.9 in., Set prior gate vertical displacement of prior remote gate in the system at ~4 in., until all gate vertical displacements of all remote gates in the system are at ~4 in. |
| seeding | ~5 | Adjust gate vertical displacement to effect water level to compensate for evaporation | | | Intermediate Flow Position | ~4 in. | ~4 in. | Maintain water level at ~4 in. for facilitating seeding. |
| Applying Herbicide | ~6–~15 | | | | Full "OFF" Flow Position | ~4 in.–~1.5 in. | ~4 in. | Maintain gate vertical displacement at ~4 in. W/o flow to maximize efficacy of herbicides. Then decrease water level. |
| Growing | ~16–~120 | If air temperature > ~100 F or < ~60 F, adjust gate vertical displacement to raise water level to ~3 in., thereby adjusting water level to compensate for evaporation or chilling | | If measured wind speed > threshold wind speed, adjust vertical displacement of all remote gates to their maximum travel for preventing water from blowing off the reservoirs. | Intermediate Flow Position | ~1.5 in. If sudden drop occurs in water level below predetermined threshold, e.g., Break in leave, alarm is triggered. | ~1.5 in. | Maintain water level at ~1.5 in. |
| Draining | ~121–~130 | | | | Full "OFF" Flow Position | ~1.5 in.–~0 in. | ~1.5 in. | Allow water to evaporate. By day 130, essentially all water should be evaporated. |
| Harvesting | ~132–~150 | | | | Full "OFF" Flow Position | ~0 in.–~4 in | ~0 in. | Empty any remaining water, wait for reservoirs to dry, and then harvest crops. |
| Decomposing | ~151–~365 | | | | Intermediate Flow Position | ~0 in.–~5 in | ~0 in.–~5 in | Maintain the water level at ~1 in.–~5 in during wildlife habitation periods for rice decomposition or otherwise leave dry in the absence of wildlife habitation. |

SMART SUSTAINABLE AGRICULTURAL/AQUACULTURAL SYSTEM AND METHODS

BACKGROUND OF THE INVENTION

1. Field of the Invention

The present invention generally relates to agricultural/aquacultural systems and methods. More specifically, the present invention generally relates to sustainable agricultural/aquacultural systems and methods. Even more specifically, the present invention generally relates to smart sustainable agricultural/aquacultural systems and methods for growing products, such as flooded grain crops and aqueous organisms.

2. Discussion of the Related Art

With respect to agriculture, this endeavor is generally defined as the farming of food, such as plant, animal, e.g., herd animals and poultry, and life forms in between plant and animal, such as fungi, e.g., mushrooms. Agriculture has been instrumental in the development of human civilization and includes growing crops as well as animal husbandry for the main purpose of creating food surpluses for the benefit of human society. Agriculture includes many farming techniques, such as tilling soil, providing irrigation, and herding livestock. A specific technique includes hydroponics, such as in growing tomatoes, for example.

Since ancient times, self-subsistence farming has been used and is still popular in undeveloped and developing countries. In developed countries, agriculture includes a wide range of farming techniques, such as sustainable agriculture, e.g., permaculture and organic agriculture, and intensive farming, e.g., industrial organic agriculture and commercial agriculture. Modern agriculture also involves genetic alteration, pesticides, and fertilizers.

One form of agriculture involves the use of flooding fields, ponds, or bogs for crops, such as rice, organic rice, wild rice, cranberries, and the like. The related art method for cultivating rice is flooding the fields while, or after, planting young seedlings. This related art method requires extensive manual water management, e.g., planning and servicing, of the water as well as extensive construction, e.g., damming and channeling, for the fields. Although flooding is not mandatory in growing rice or organic rice, all other methods of irrigation require extensive effort in weeding, controlling pests, and fertilizing.

Another example of a crop, being grown using flooded agriculture, is wild rice, a dark grain which grows in shallow water, such as small lakes and slow-flowing streams, such as found in Canada, northern United States, and parts of Asia. Typically, the flowering head of the wild rice plant is disposed above water level. Before 1965, most wild rice in the United States was produced in natural stands, such as lakes, rivers, and streams. In Canada, most wild rice is still produced in lakes and streams that are leased from the government. Growing wild rice as a field crop was suggested in the 1850s, but significant efforts did not begin until about 1950 when James and Gerald Godward began to grow wild rice in a one-acre diked and flooded field (reservoir) near Merrifield, Minn.

Yet another example of a crop, being grown using flooded agriculture, is the cranberry, a fruit that is grown in wet, marshy areas, such as bogs. Cranberries grow best in climates having a cool growing season without extreme cold. Cranberry farms are mostly found in the Canadian provinces of Nova Scotia, Quebec, Ontario, and British Columbia. In the United States, they are grown in Massachusetts, New Jersey, Wisconsin, Oregon, and Washington. The marshy cranberry bogs have peat formed at the bottom when dead plants fall and disintegrate. The cranberry "beds" comprise sand and peat. Banks are typically formed around these cranberry beds. Ditches are typically formed around the cranberry beds, whereby a farmer manually feeds water from a holding area having a higher elevation.

In addition to conventional crops, a specialized category of agriculture, called aquaculture or aquafarming, is generally defined as the farming of freshwater and saltwater organisms, such as finfish, mollusks, crustaceans, and aquatic plants, such as seaweed. Aquaculture involves cultivating aquatic organisms, under somewhat controlled conditions, in contrast to commercial fishing, being defined as the harvesting of wild fish.

For example, a form of aquaculture is mariculture, being defined as the practice of aquaculture in a marine environment. Other forms of aquaculture include algaculture, being defined as the practice of growing kelp/seaweed and other algae, fish farming, shrimp farming, oyster farming, the culturing of pearls, and the growing of ornamental fish. Some specific techniques include aquaponics, which integrates fish farming and plant farming.

Although primitive techniques, such as flooded rice reservoirs and oyster beds, have been largely replaced with commercialized and industrialized farming operations, these modern techniques remain inefficient, unsustainable, and largely uncontrolled.

SUMMARY OF THE INVENTION

Several embodiments of the invention advantageously address the above needs as well as other needs by providing an agricultural/aquacultural system that is smart, sustainable, efficient, productive in both crop yield and human factors, automated, conserves water, minimizes environmental impact, optimizes wildlife habitat, minimizes pollutant generation, such as nitrogenous and organic carbon wastes, and reduces energy consumption, and its related methods.

In one embodiment, the invention can be generally characterized as an agricultural/aquacultural system for use with a plurality of growth reservoirs containing a fluid, comprising a main control unit for receiving feedback and providing control, at least one pump control unit in electronic communication with the main control unit, and at least one gate control unit in electronic communication with the main control unit.

In an alternative embodiment, the invention can be generally characterized as a method of fabricating an agricultural/aquacultural system for use with a plurality of growth reservoirs containing a fluid, the method comprising providing a main control unit for receiving feedback and providing control, providing at least one pump control unit in electronic communication with the main control unit, and providing at least one gate control unit in electronic communication with the main control unit.

In yet another embodiment, the invention can be generally characterized as a method of using an agricultural/aquacultural system for use with a plurality of growth reservoirs containing a fluid, the method comprising: providing an agricultural/aquacultural system, the system providing step comprising providing a main control unit for receiving feedback and providing control, providing at least one pump control unit in electronic communication with the main control unit, and providing at least one gate control unit in electronic communication with the main control unit powering the system and running the system.

BRIEF DESCRIPTION OF THE DRAWINGS

The above and other aspects, features and advantages of several embodiments of the present invention will be more apparent from the following more particular description thereof, presented in conjunction with the following drawings.

FIG. 15 is a table showing a growth algorithm as used in a smart sustainable agricultural/aquacultural system, in accordance with an embodiment of the present invention.

Figure 1:
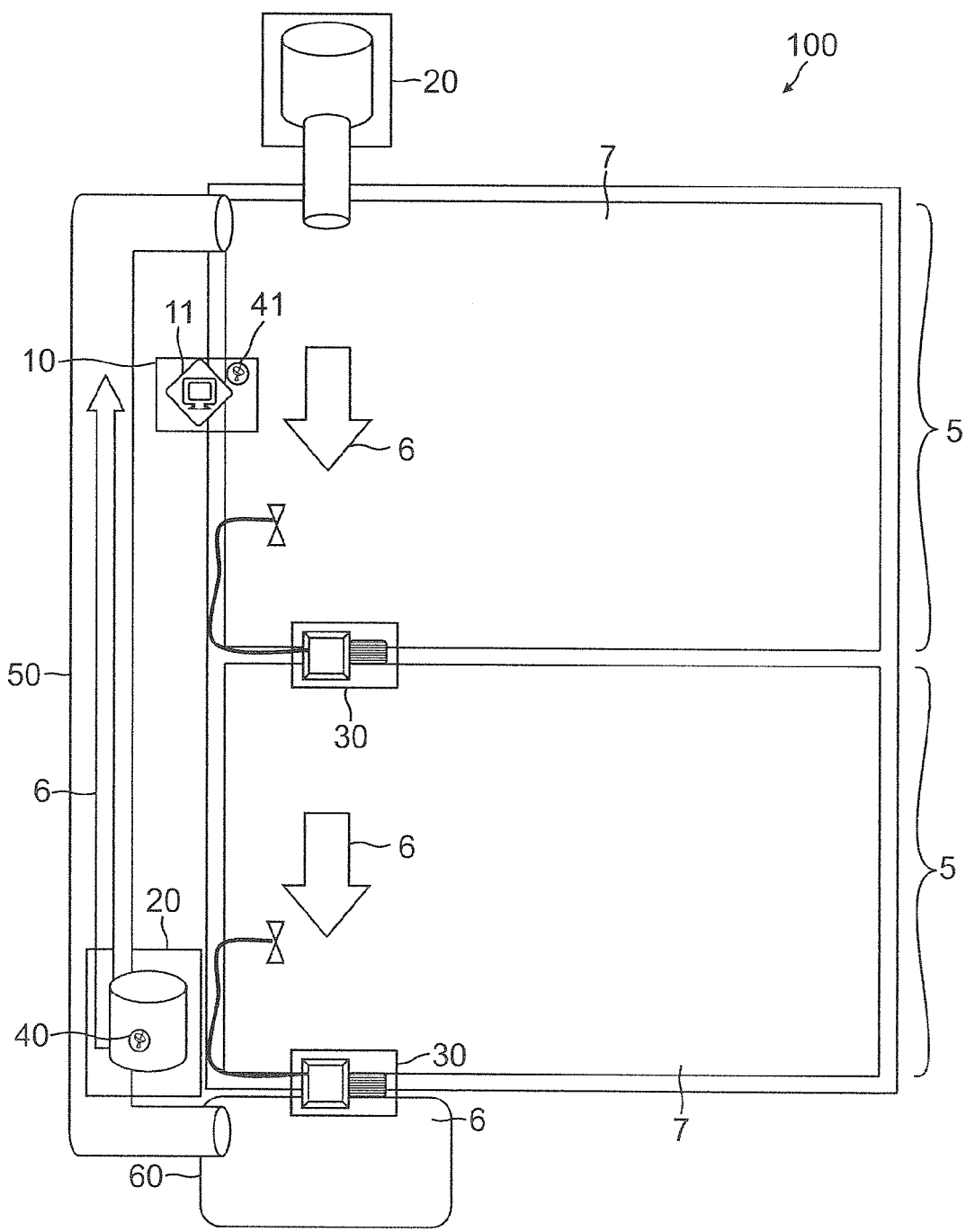
FIG. 1 is a schematic diagram of a smart sustainable agricultural/aquacultural system for use with a plurality of growth reservoirs containing a fluid, such as a rice reservoir, in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of computing devices, sensing devices, actuating devices, pumps, gates, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Some embodiments of the present invention generally involve an agricultural/aquacultural system for use with a plurality of growth reservoirs containing a fluid, comprising a main control unit for receiving feedback and providing control, at least one pump control unit in electronic communication with the main control unit, and at least one gate control unit in electronic communication with the main control unit. The system may be smart and sustainable, wherein the system is smart due to its self-monitoring and automatic operation, and whereby the system promotes sustainable agricultural/aquacultural practices.

Some benefits of the invention include, but are not limited to, the following examples: increasing food yield and overall productivity by increasing yield in the world's major food staple, by continuously adjusting water levels to an optimal depth while the crop grows, by continuously adjusting water levels to an optimal temperature for maximizing growth, by increasing farm worker productivity, by using algorithms, such as adaptive algorithms, for managing water levels, and other parameters, such as temperature, etc., by automating irrigation of the crops, by providing a remote and centralized control of the crops in growth reservoirs, and by enabling remote expert consultation; environmental protection, especially water conservation, by reducing water usage in growing water-intensive crops, by limiting water-runoff waste, by collecting windswept water from a crop field, by monitoring water leaks from the growth reservoirs, by eliminating double irrigation, i.e., reducing scheduled field irrigation during a rainy season; decreasing herbicide and pesticide impact on the environment by managing water levels to minimize herbicide and pesticide usage, by monitoring weeds and pests using a camera, by filtering and recycling waste water, thereby minimizing release of environmental hazards into the water system and the environment; by decreasing excess nitrogen outflow by monitoring fields using a camera and an optical sensor, thereby avoiding excess application of fertilizers; maximizing wildlife opportunity by communicating migration surveys to environmental agencies, such as the U.S. Fish and Wildlife Agency (USFW) for anticipating migrations in order to provide habitat by controlling flooding in connection with such migrations; reducing organic carbon outflow; utilizing wildlife for decomposing waste straw while minimizing water usage; reducing peak utility usage by utilizing off-peak power, thereby minimizing impact to an existing power grid.

Referring first to FIG. 1, this schematic diagram illustrates a smart sustainable agricultural/aquacultural system 100 for use with a plurality of growth reservoirs 5 containing a fluid 6 and a life form 7, such as a crop and an organism, e.g., rice, a crop in a rice reservoir, by example only, in accordance with an embodiment of the present invention. The system 100 comprises a main control unit 10 for receiving feedback and providing control, either by wire or wirelessly, and powered by at least one source (not shown), such as an external power source, e.g., the power grid, and a solar power source, at least one pump control unit 20 in wire or wireless electronic communication with the main control unit 10 and powered by at least one source (not shown), such as an external power source, e.g., the power grid, and a solar power source, and at least one gate control unit 30 in wireless electronic communication with the main control unit 10 and powered by at least one source (not shown), such as an external power source, e.g., the power grid, and a solar power source. The main control unit 10 comprises a computer 11, having a wire or wireless node (not shown), and at least one element, such as a camera, an atmospheric temperature sensor, and an environmental data collection device, the main control unit 10 being disposable anywhere within signal transmission range of at least one router (not shown) associated with each at least one pump control unit 20 and each at least one gate control unit 30, the pump control unit 20 comprising a remote pump 21 (FIG. 4) being wirelessly switchable by the main control unit 10 and a flow meter 22 (FIG. 5) for measuring a flow rate of the fluid 6. The gate control unit 30 comprises a remote gate 31 (FIG. 6) for controlling flow of the fluid 6 between any two growth reservoirs 5 of the plurality of growth reservoirs 5. The computer 11 may optionally comprise a laptop computer. The gate control unit 30 further comprises a solar power device 32 (FIG. 9) and a measurement device (not shown), e.g., a probe extending into the growth reservoir 5 for measuring at least one parameter of the fluid 6, such as a temperature, a depth, and a fluid quality level, and a motor 36 (FIG. 7) for actuating the remote gate 31. The system 100 further comprises a mesh network (not shown) and at least one weather station. The system 100 may further comprise a pipe 50 for facilitating fluid communication between a holding pond 60 and the at least one growth reservoir 5.

Still referring to FIG. 1, in the smart sustainable agricultural/aquacultural system 100, the plurality of growth reservoirs 5, containing the fluid 6 and the life form 7, each reservoir 5 is in optional fluid communication with another reservoir 5. The main control unit 10 is in wire or wireless communication with the at least one pump control unit 20 and the at least one gate control unit 30. Each of the main control unit 10, the at least one pump control unit 20, and the at least one gate control unit 30, are coupled with at least one power source (not shown), such as an external power source, e.g., the power grid, and a solar power source, at least one pump control unit 20 in wire or wireless electronic communication with the main control unit 10 and powered by at least one source (not shown), such as an external power source, e.g., the power grid, and a solar power source, and at least one gate control unit 30 in wire or wireless electronic communication with the main control unit 10 and powered by at least one source (not shown), such as an external power source, e.g., the power grid, and a solar power source. The computer 11 is in wire or wireless electronic communication with at least one element, such as a camera, an atmospheric temperature sensor, and an environmental data collection device. If in a wireless communication mode, the main control unit 10 is disposable anywhere within signal transmission range of at least one router (not shown) associated with each at least one pump control unit 20 and each at least one gate control unit 30. The remote pump 21 is in wire or wireless communication with, and is wire or wirelessly switchable by, the main control unit 10. The flow meter 22 is in wire or wireless communication with the main control unit 10 as well. The gate control unit 30 is in wire or wireless communication with the main control unit 10, whereby the remote gate 31 is adapted to control flow of the fluid 6 between any two growth reservoirs 5 of the plurality of growth reservoirs 5. The solar power device 32 is coupled with the motor 36 and a motor 36 for actuating the remote gate 31. The measurement device (not shown), e.g., a probe extending into the growth reservoir 5, for measuring at least one parameter of the fluid 6, such as a temperature, a depth, and a fluid quality level, is in wire or wireless communication with the main control unit. The mesh network (not shown) is in wire or wireless communication with the at least one weather station. The at least one mesh network module 40 is in wire or wireless communication with at least one element, such as the at least one weather station, the main control unit 10, and any other at least one mesh network module 40. The pipe 50 couples the holding pond 60 with the at least one growth reservoir 5.

Still referring to FIG. 1, in operation of the system 100, the main control unit 10 comprises the computer 11 having software (not shown) for monitoring and controlling the at least one pump control unit 20 and the at least one gate control unit 30. The software comprises a growth algorithm (not shown), being crop-specific or organism-specific, and is constantly running and operates the wire or wireless network (not shown) and will further receive data (not shown) from at least one pump control unit 20 and the at least one gate control unit 30 that are disposed in relation to each growth reservoir 5 being, in turn, disposed in a field, by example only, through the mesh network. The computer 11 includes Internet access (not shown) via at least one element, such as a land line, a wide area network, a WiFi connection, and a mobile cellular service data connection. The Internet access facilitates remotely and interactively updating the growth algorithm and transferring data for offline analysis. The at least one weather station (not shown) detects at least one parameter, such as air temperature, humidity, wind speed, and the like. The at least one weather station is monitored by the at least one mesh network module 40. The at least one mesh network module 40 relays information from the at least one weather station and any other at least one mesh network module 40 in the wire or wireless network 200 to the computer 11 while sending at least one command from the computer 11 through the mesh network. The computer 11, optionally comprising a laptop computer, may also be adapted to access online weather information, such as weather warnings and weather forecasts, and may also be adapted to update the growth algorithm in accordance with the online assessable weather information. Alternatively, a remote operator (not shown) can manually update the growth algorithm at any time. The pipe 50 facilitates fluid communication between the holding pond 60 and the at least one growth reservoir 5.

Figure 2:
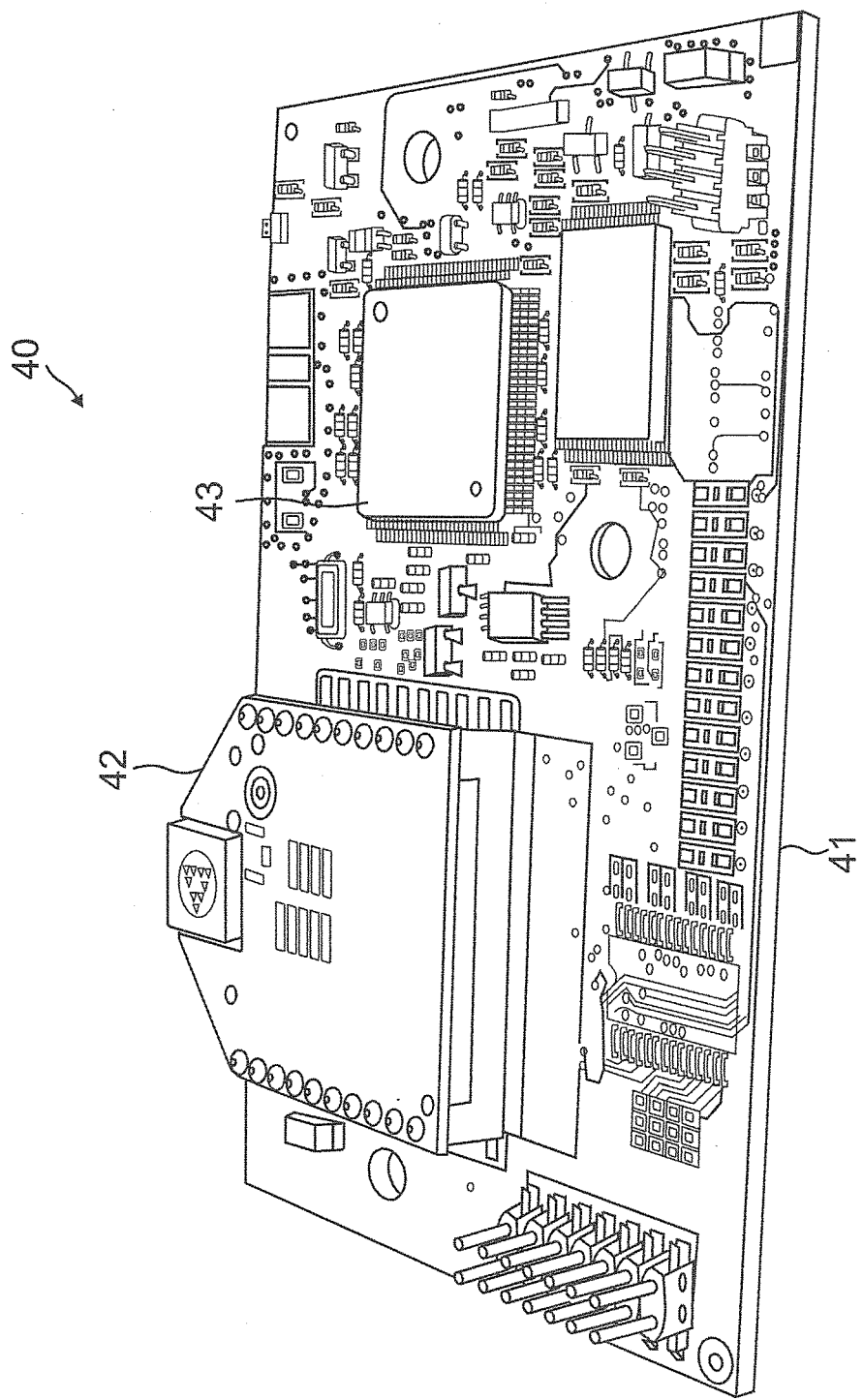
FIG. 2 is a perspective view of a mesh network module of a pump control unit in a smart sustainable agricultural/aquacultural system, in accordance with an embodiment of the present invention.

Referring next to FIG. 2, this perspective view illustrates at least one mesh network module 40 of a pump control unit 20 in a smart sustainable agricultural/aquacultural system 100, in accordance with an embodiment of the present invention. Each at least one mesh network module 40 optionally comprises a printed circuit board 1, an on-board modem 2 for providing wireless connectivity, a flash memory (not shown), e.g., in a range of approximately 512K, and an SRAM (not shown), a plurality of general-purpose I/O nodes, and a microprocessor 43 wherein a portion of the I/O nodes are adaptable as analog inputs via the modem 42, e.g., a ZigBee module. The wire or wireless network 200 uses a protocol data attachment that is consistent with a given probe 80 (FIG. 8), e.g., having a 4-mA/20 designation. Each microprocessor 43 features a clock speed in a range of up to approximately 29.49 MHz. Each mesh network module 40 further comprises other features (not shown), such as hardware DMA, an auxiliary I/O, a quadrature decoder, an input capture, a plurality of GPIO lines shared with up to approximately 5 serial ports, and approximately four levels of alternate pin functions that include variable phase PWM. The mesh network module 40 comprises a small footprint in a range of approximately 1.84"×2.42" (e.g., 47 mm×61 mm), and is, thus, compact and easily directly mountable onto a user-designed motherboard, along with other CMOS-compatible digital devices.

Still referring to FIG. 2, the printed circuit board 41 has thereon mounted the microprocessor 43, an on-board modem for providing wireless connectivity, a flash memory (not shown), e.g., in a range of approximately 512K, and an SRAM, a plurality of general-purpose I/O nodes, wherein a portion of the I/O nodes are adaptable as analog inputs via the modem 42, e.g., a ZigBee module. The printed circuit board 42 may also have thereon mounted other features (not shown), such as hardware DMA, an auxiliary I/O, a quadrature decoder, an input capture, a plurality of GPIO lines shared with up to approximately 5 serial ports, and approximately four levels of alternate pin functions that include variable phase PWM, and other CMOS-compatible digital devices.

Figures 8, 9:
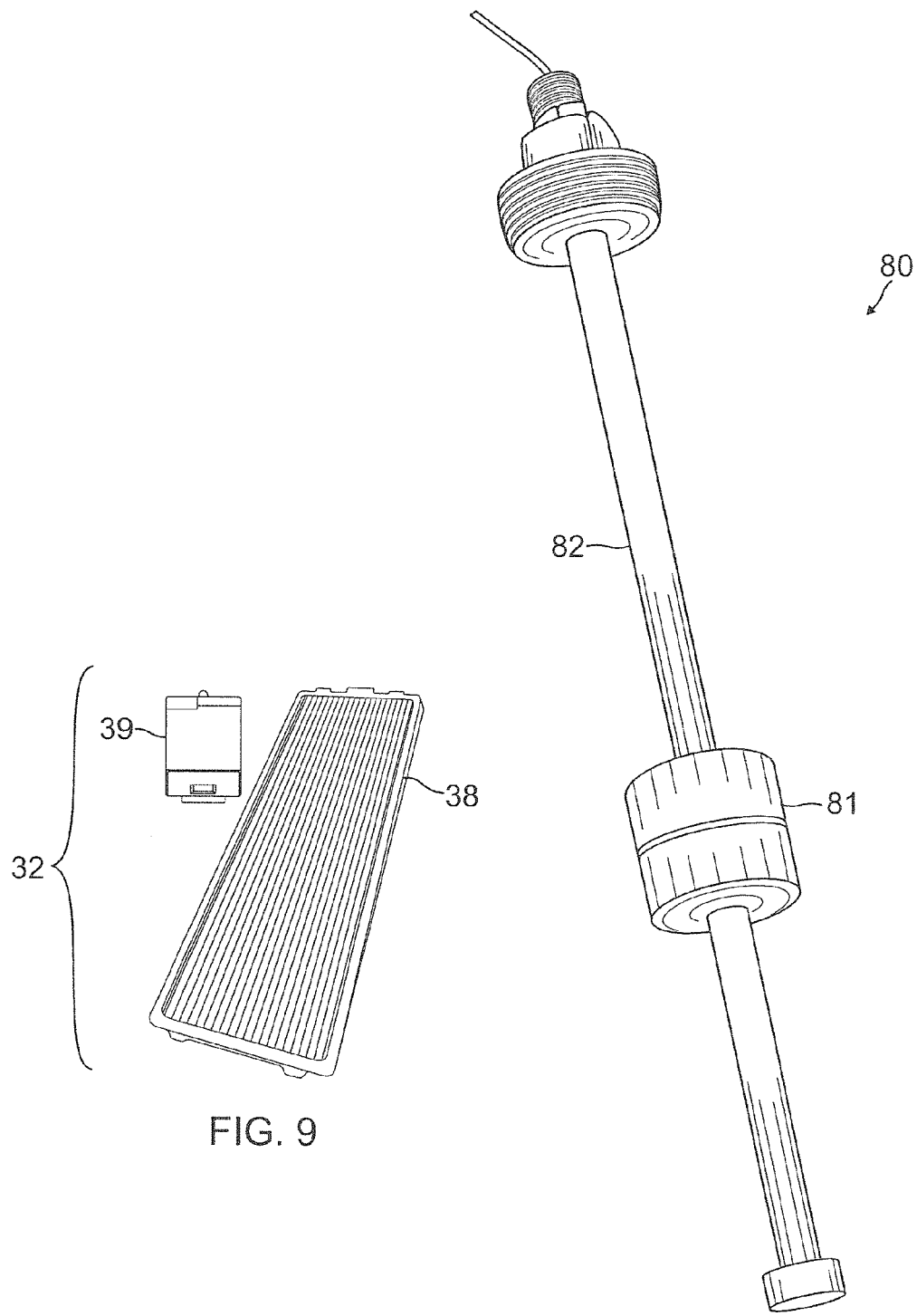
FIG. 8 is a perspective view diagram of a probe as used in a smart sustainable agricultural/aquacultural system, in accordance with an embodiment of the present invention.
FIG. 9 is a perspective view diagram of a solar panel device of a gate control unit in a smart sustainable agricultural/aquacultural system, in accordance with an embodiment of the present invention.
Figure 10:
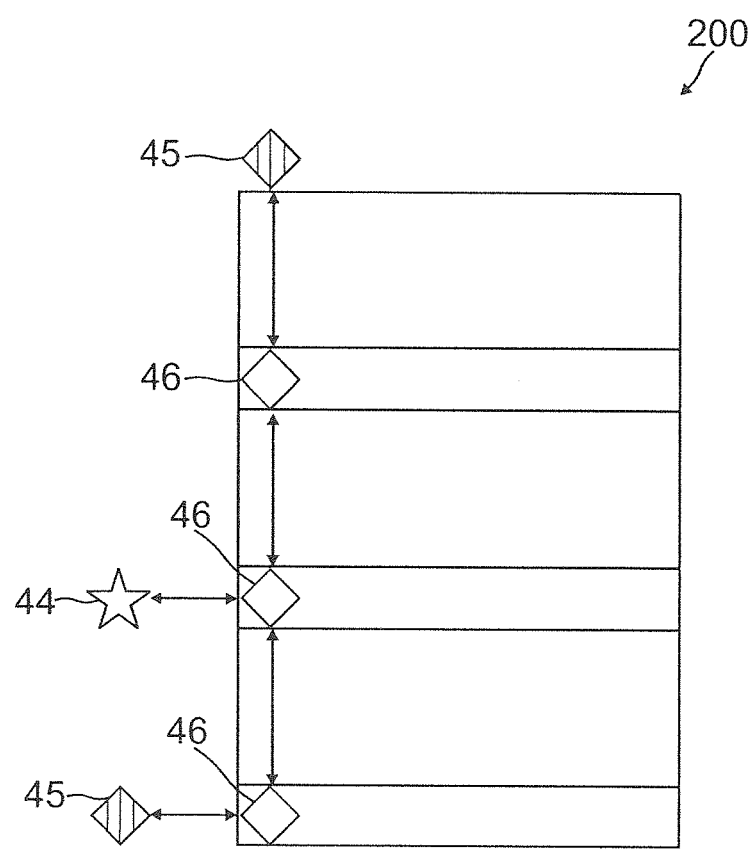
FIG. 10 is a schematic diagram of a network, being wire or wireless, of a smart sustainable agricultural/aquacultural system, in accordance with an embodiment of the present invention.

Still referring to FIG. 2, in operation, the at least one mesh network module 40 relays on/off commands to the pump control unit 20 from the main control unit 10 and transmits data gleaned from the flow meter 22 to main control unit 10 for analysis and processing (see also FIGS. 1 and 10). The flow meter 22 may be disposed in a range of approximately 1 foot to approximately 20 feet from the remote pump 21. Alternatively, the flow meter 22 may be disposed in relation to the remote gate 31, e.g., comprising a sliding weir gate 33, itself. The wire or wireless network 200 uses a protocol data attachment that is consistent with a given probe 80 (FIG. 8), e.g., having a 4-mA/20 designation. Each microprocessor 42 features a clock speed in a range of up to approximately 29.49 MHz. Each mesh network module 40, further comprises other features, such as hardware DMA, an auxiliary I/O, a quadrature decoder, an input capture, a plurality of GPIO lines shared with up to approximately 5 serial ports, and approximately four levels of alternate pin functions that include a variable phase PWM, that perform further data collection. The module 40 comprises a small footprint in a range of approximately 1.84"×2.42" (e.g., 47 mm×61 mm), and is, thus, compact and easily directly mountable onto a user-designed motherboard, along with other CMOS-compatible digital devices.

Figure 3:
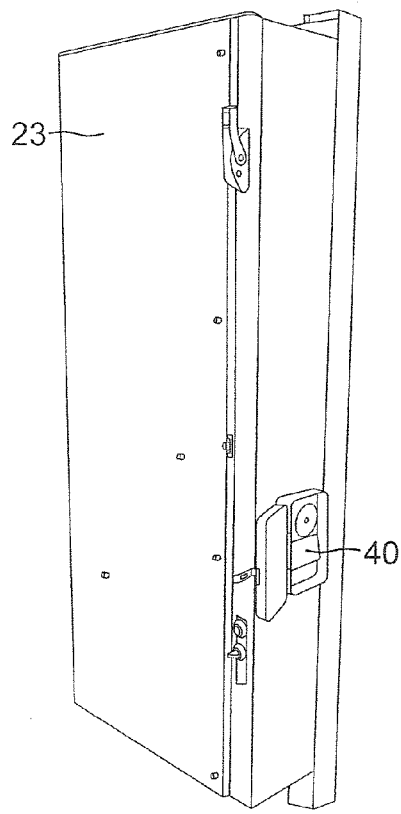
FIG. 3 is a perspective view diagram of an electric box of a pump control unit in a smart sustainable agricultural/aquacultural system, by example only, in accordance with an embodiment of the present invention.

Referring next to FIG. 3, this perspective view diagram illustrates an electric box 23 of a pump control unit 20 in a smart sustainable agricultural/aquacultural system 100, in accordance with an embodiment of the present invention. Each at least one pump control unit 20 comprises a remote pump 21, being wire or wirelessly switchable by the main control unit 10, a flow meter 22 for measuring a flow rate of the fluid 6, and an optional electric box for powering the remote pump 21. The pump control unit 20 may have an associated mesh network module 40.

Still referring to FIG. 3, the electric box 23 of a pump control unit 20 in a smart sustainable agricultural/aquacultural system 100 is coupled with the remote pump 21, being wire or wirelessly switchable by the main control unit 10. The flow meter 22 is disposed within a pipe at a distance in a range of approximately 1 foot to approximately 20 feet from the remote pump 21. The flow meter 22 is in wire or wireless communication with the associated mesh network module 40. In this example, the pump control unit 20 is coupled with an electric source, via the electric box 23 for powering the pump. Optional batteries or solar power devices are not needed in this example, but may be added if desired, and coupled with the pump control unit 20. The associated mesh network module 40 may be disposed on the electric box 23. Also optionally, a remote pump 21 may be mounted in relation to a gate of an irrigation distribution channel and is wire or wirelessly switchable at such location.

Still referring to FIG. 3, the electric box 23 of a pump control unit 20 in a smart sustainable agricultural/aquacultural system 100, powers the remote pump 21 that is wire or wirelessly switchable by the main control unit 10. The flow meter 22 measures a flow rate of the fluid 6 that is downstream from the remote pump 21 and communicates the flow rate to the main control unit 10 via the associated mesh network module 40. In this example, the electric box 23 powers the remote pump 21. However, optional batteries or solar power devices, while not needed in this example, may be added if desired for other embodiments of the invention.

Figure 4:
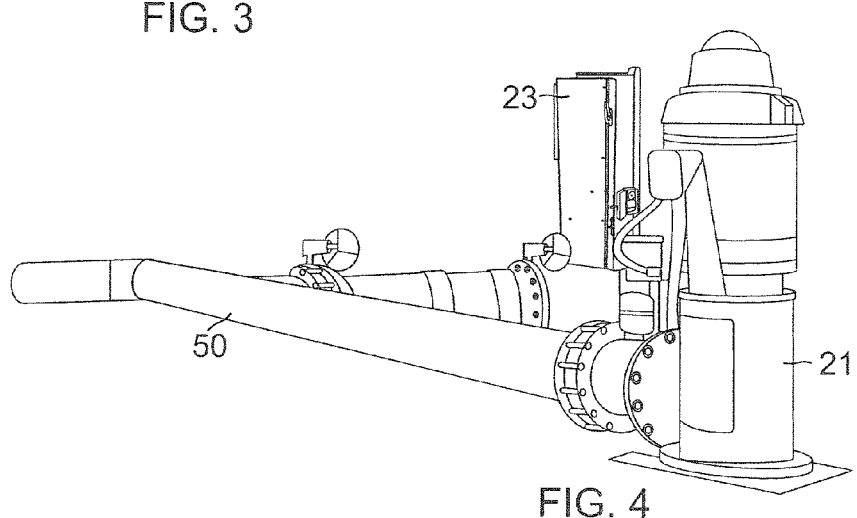
FIG. 4 is a perspective view diagram of a pump control unit in a smart sustainable agricultural/aquacultural system, in accordance with an embodiment of the present invention.

Referring next to FIG. 4, this perspective view diagram illustrates a pump control unit 20 in a smart sustainable agricultural/aquacultural system 100, in accordance with an embodiment of the present invention. Each pump control unit 20 comprises a remote pump 21 that is motorized, a flow meter 22, and a power source, such as the electric box 23 or optional batteries or solar power devices. The pump control unit 20 may have an associated mesh network module 40.

Still referring to FIG. 4, the electric box 23 is coupled with the remote pump 21, in turn, being wire or wirelessly coupled with, and wire or wirelessly switchable by, the main control unit 10. The flow meter 22 is disposed within a pipe at a distance in a range of approximately 1 foot to approximately 20 feet from the remote pump 21. The flow meter 22 is in wire or wireless communication with the associated mesh network module 40. In this example, the pump control unit 20 is coupled with an electric source via the electric box 23 for powering the pump. Optional batteries or solar power devices are not needed in this example, but may be added if desired, and coupled with the pump control unit 20. The associated mesh network module 40 may be disposed on the electric box 23.

Still referring to FIG. 4, the electric box 23, or batteries, or solar power devices may power the remote pump 21, in turn, which is wire or wirelessly switchable by the main control unit 10. The at least one pump control unit 20 comprises the remote pump 21 for pumping the fluid 6. The flow meter 22 is disposed within a pipe at a distance from the remote pump 21 in order to make an accurate measurement of the flow rate within the pipe 50 (FIG. 1). The flow meter 22 wire or wirelessly communicates with the associated mesh network module 40. The associated mesh network module 40 may be disposed on the electric box 23 for sufficient proximity to the remote pump 21 and the flow meter 22.

Figure 5:
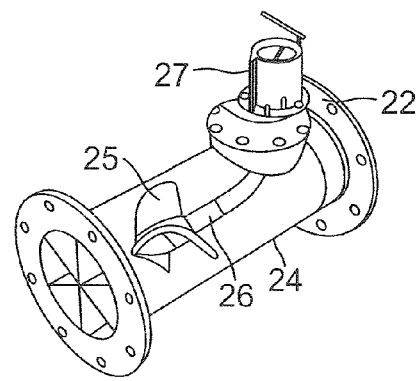
FIG. 5 is a perspective view diagram of a flow meter of a pump control unit in a smart sustainable agricultural/aquacultural system, in accordance with an embodiment of the present invention.

Referring next to FIG. 5, this perspective view diagram illustrates a flow meter 22 of a pump control unit 20 in a smart sustainable agricultural/aquacultural system 100, in accordance with an embodiment of the present invention. The flow meter 22 comprises a housing 24, having an inlet and an outlet, a vane or propeller member 25, a driveshaft 26, and a transducer 27. The driveshaft 26 comprises a flexible drivetrain and sealed ball bearings. The flow meter 22 also comprises features (not shown), such as an instantaneous flow rate indicator and a six-digit "totalizer."

Still referring to FIG. 5, the flow meter 22 is disposed within the pipe 50 at a distance in a range of approximately 1 foot to approximately 20 feet from the remote pump 21. The vane or propeller member 25 is coupled with the driveshaft 26, which is, in turn, coupled with the transducer 27.

Still referring to FIG. 5, the flow meter 22 measures the flow rate of the fluid 6 in the pipe 50 by constantly monitoring the flow rate of the fluid 6 in the pipe 50. The flow meter 22 collects flow rate data via the transducer 27 and wire or wirelessly communicates the flow rate data to the associated mesh network module 40. The propeller member 25 facilitates an economical and versatile flow measurement and is adapted to handle dirty water flows, such as in agricultural applications, municipal water applications, and other high-volume water applications. The driveshaft 26 comprises a flexible drive-train and sealed ball bearings, adapted to facilitate field service and to eliminate the need for an external power or batteries. The flow meter 22 may also be compliant with an AWWA C704-08 standard. The flow meter 22 handles solids that are suspended in water without clogging. With its high accuracy, the flow meter 22 also functions as a water management tool, thereby reducing water costs, preventing over-irrigation, and reducing leaching of chemicals and fertilizers into the ground.

Figure 6:
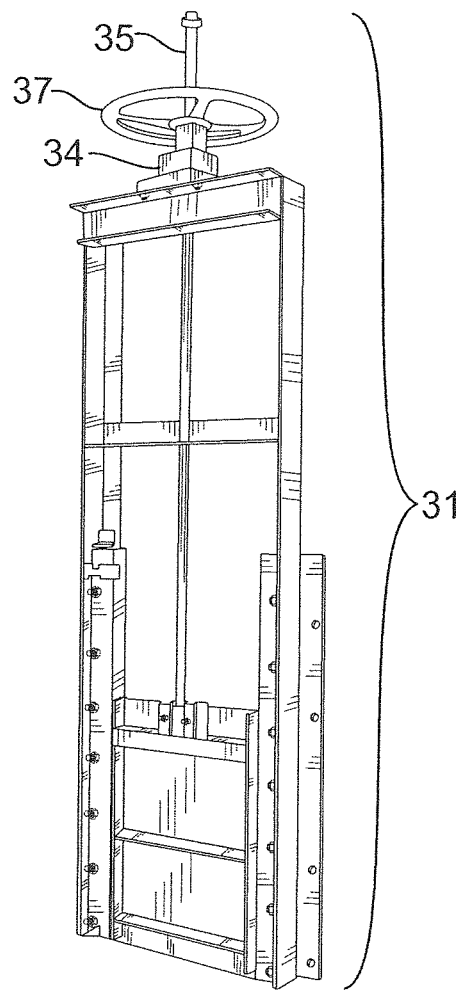
FIG. 6 is a perspective view diagram of a remote gate of a gate control unit in a smart sustainable agricultural/aquacultural system, in accordance with an embodiment of the present invention.

Referring next to FIG. 6, this perspective view diagram illustrates a remote gate 31 of a gate control unit 30 in a smart sustainable agricultural/aquacultural system 100, in accordance with an embodiment of the present invention. Each gate control unit 30 comprises a remote gate 31, a motor 36, a power source (not shown), such as a battery (not shown), a solar power device 32, a measuring device (not shown), such as a probe 80 (FIG. 8), e.g., a floating probe, and an associated mesh network module 40. Each gate control unit 30 draws power from both the battery and the solar power device 32. The remote gate 31 comprises a sliding weir gate 33. The remote gate 31 is sunken into a levee of the at least one growth reservoir 5 and performs in response to instructions received from the associated mesh network module 40 for controlling a fluid level of the at least one growth reservoir 5. At least one probe 80 (FIG. 8) can be used to measure at least one parameter, such as the fluid level, the water temperature, and any other water quality levels. Examples of other water quality measurements include a measurement of pH and a measurement of chlorophyll concentration. The at least one probe 80 is disposed in the growth reservoir 5 and wire or wirelessly communicates with the associated mesh network module 40. In addition, a probe 80 may be disposed in relation to the sliding weir gate 33 for measuring the position of the gate 33.

Still referring to FIG. 6, the remote gate 31 is coupled with the motor 36 and the power source (not shown), such as a battery (not shown) and a solar power device 32. The measuring device (not shown), such as a probe 80, is in wire or wireless communication with the associated mesh network module 40. The sliding weir gate 33 is actuated by the motor 36 in response to instructions received from the associated mesh network module 40. The remote gate 31 is sunken into the levee (not shown) of the at least one growth reservoir 5 for controlling its fluid level. The probe 80 is disposed in the growth reservoir 5 and in wire or wireless communication with the associated mesh network module 40.

Still referring to FIG. 6, each gate control unit 30 draws power, in an on-demand basis, from either the battery or the solar power device 32. The remote gate 31 performs in response to instructions received from the associated mesh network module 40 for controlling a fluid level of the at least one growth reservoir 5. The motor 36 operates the remote gate 31 by actuating the sliding weir gate 33. Since the at least one gate control unit 30 further comprises a sliding weir gate 33 and a motor 36 coupled with the remote gate 31 for actuating the sliding weir gate 33, the remote gate 31, being disposed into a levee of the at least one growth reservoir 5, is actuated in response to at least one instruction transmitted via the corresponding mesh network module 40 for controlling a level of the fluid 6 in the at least one growth reservoir 5. For example, the motor 36 actuates a wheel 37 disposed at a top of the remote gate 31, whereby the sliding weir gate 33 translates in response thereto, and whereby a level of the fluid 6 in any two growth reservoirs 5 is adjusted as needed in accordance with instructions transmitted from the corresponding or associated mesh network module 40. The probe 80 measures the fluid level, the water temperature, and any other water quality levels, such as a measurement of pH and a measurement of chlorophyll concentration. The probe 80 wire or wirelessly communicates with the associated mesh network module 40. The associated mesh network module 40 relays on/off commands to the motor 36 and transmits data from the probe 80 to the main control unit 10 for analysis and processing.

Figure 7:
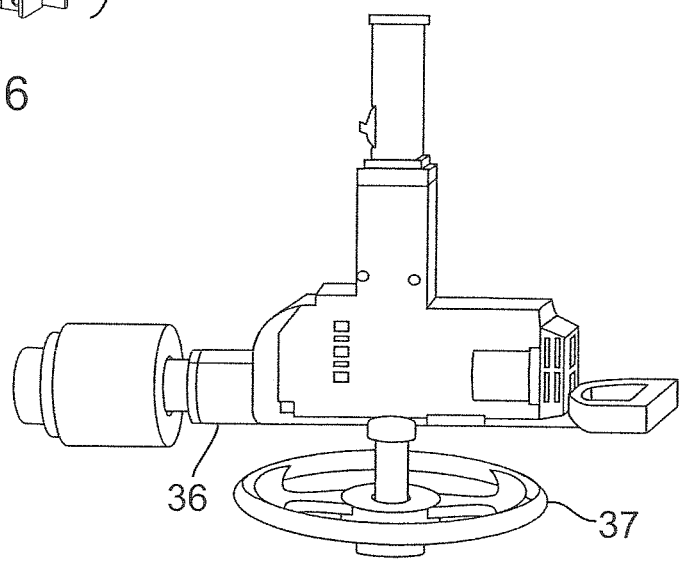
FIG. 7 is a perspective view diagram of a motor of a gate control unit in a smart sustainable agricultural/aquacultural system, in accordance with an embodiment of the present invention.

Referring next to FIG. 7, this perspective view diagram illustrates a gate control unit 30, having a motor 36, in a smart sustainable agricultural/aquacultural system 100, in accordance with a general embodiment of the present invention. The motor 36 may comprise a 460-V, 3 phase, 60-Hertz motor with precision reduction gearing enclosed in weather-proof housing. The operator (not shown) shall be designed to raise the remote gate 31 at a rate of approximately 12 in/min. Integral controls (not shown) may include a control power transformer, a reversing controller, torque and limit switches, a space heater to prevent condensation, and pen-stop-close push buttons. The motor 36 comprises electronically actuable mechanisms or "operator" (not shown) as well as an optional manual-crank wheel 37.

Still referring to FIG. 7, the motor 36 is coupled with the remote gate 31, e.g., at the top of the remote gate 31. The motor 36 is enclosed in weather-proof housing 34 and is coupled with a crankshaft 35. The manual crank wheel 37 is also coupled with the crankshaft 35. The crank shaft 35 is coupled with the sliding weir gate 33.

Still referring to FIG. 7, in operation of the system 100, the motor 36 turns the wheel 37 (FIG. 6) at the top of the remote gate 31, thereby causing the sliding weir gate 33 to travel, i.e., ascend or descend, whereby the level of the fluid 6 in any two growth reservoirs 5 is adjusted as needed in accordance with specific instructions transmitted from the associated mesh network module 40. The motor 36 further actuates the sliding weir gate 33 to compensate for fluid 6 that would otherwise be blown over the remote gate 31 during a windy condition, such as high winds. A rechargeable battery (not shown) may power all components of the gate control unit 30. The battery stores electricity collected from the solar power device 32. The power is drawn from the battery in short bursts, or in an on-demand basis, during the day or the night to power the motor 36. The associated mesh network module 40 demands very little continuous power and is, thus, always coupled with the battery system (not shown).

Referring next to FIG. 8, this perspective view diagram illustrates a probe 80 as used in a smart sustainable agricultural/aquacultural system 100, in accordance with an embodiment of the present invention. The probe 80 may comprise a continuous tank level indicator. The probe 80 comprises at least one float 81 and a plurality of float switches (not shown). A float 81 optionally comprises a magnet (not shown). The probe 80 further comprises a plurality of reed switches (not shown). Each float 81 comprises at least one material, such as stainless steel, brass, polypropylene, and Buna-N rubber; and each float 81 is adapted to precisely and continuously measure a liquid level with a resolution in a range of approximately 10 mm to approximately 2.54 cm. Each float switch comprises a range of available output signals, such as 4-20 mA, 1-5 DC, resistive, etc.

Still referring to FIG. 8, the float 81, optionally comprising a magnet (not shown), is axially coupled with the shaft 82 of the probe 80. The probe 80 is in wire or wireless communication with the programmable controller, the microprocessor 43, or other readout device.

Still referring to FIG. 8, the probe 80 is adapted for vertical mounting in a tank or a reservoir, such as a growth reservoir 5. The probe 80 comprises a float 81 and a plurality of float switches (not shown) are evenly spaced over the operation range to achieve the desired resolution. The float 81, optionally comprising a magnet, travels the length of a sensing range along a shaft 82 of the probe 80. A plurality of reed switches (not shown) are actuated, e.g., magnetically, as the float 81 moves in accordance with the liquid level (not shown). In operation, for example, DC power is applied to a switch (not shown); and an output signal is then routed to a programmable controller, a microprocessor, or other readout device. Each float comprises at least one material, such as stainless steel, brass, polypropylene, and Buna-N rubber; and each float switch is adapted to precisely and continuously measure a liquid level with a resolution in a range of approximately 10 mm to approximately 2.54 cm. Each float switch comprises a range of available output signals, such as 4-20 mA, 1-5 DC, resistive, etc.

Referring next to FIG. 9, this perspective view diagram illustrates a solar power device 32 of a gate control unit 30 in a smart sustainable agricultural/aquacultural system 100, in accordance with a general embodiment of the present invention. The solar power device 32 comprises a solar panel 38 and a rechargeable battery 39. The solar power device 32 comprises a solar panel 38 having a size that appropriately charges the rechargeable battery 39 for at least seven days of gate operation, even with minimal sunlight.

Still referring to FIG. 9, in the solar power device 32, the solar panel 38 is coupled with the rechargeable battery 39. The solar panel device is coupled with the motor 36.

Still referring to FIG. 9, the solar power device 32 comprises a solar panel 38 which collects solar energy and provides the same to a rechargeable battery 39. The solar power device 32 comprises a solar panel 38 having a size that appropriately charges the rechargeable battery 39 for at least seven days of gate operation, even with minimal sunlight.

Referring next to FIG. 10, this schematic diagram illustrates a wire or wireless network 200 of a smart sustainable agricultural/aquacultural system 100, in accordance with an embodiment of the present invention. For example, a controller box (not shown), containing an associated mesh network module 40, may be coupled on the side of the electric box 23. The wire or wireless network 200 comprises at least one mesh network module 40 (see FIG. 1) in wire or wireless communication with at least one element, such as the at least one weather station (not shown), the main control unit 10, and any other at least one mesh network module 40. The plurality of mesh network modules 40 may comprise a host or coordinator module 44. For example, a mesh network module 40 of the plurality of mesh network modules 40, associated with a main control unit 10, may comprise a host or coordinator module 44; a mesh network module 40 of the plurality of mesh network modules 40, associated with a pump control unit 20, may comprise an end base 45; and a mesh network module 40 of the plurality of mesh network modules 40, associated with a gate control unit 30, may comprise a router 46. If the system 100 comprises a wire network 200, at least one wire (not shown) may run in a range of approximately 10 feet to approximately 20 feet between the at least one remote gate 31 and a levy (not shown).

Still referring to FIG. 10, each mesh network module 40 of the plurality of mesh network modules 40 is in wire or wireless communication with another mesh network module 40 of the plurality of mesh network modules 40, wherein all mesh network modules 40 of the plurality of mesh network modules 40 in the wire or wireless network 200, are interconnected. The routers 46 are in wire or wireless communication with one another and with either end base 45 or a host or coordinator module 44. For example, the wire or wireless network 200 may comprise three gate control units 30, wherein their associated mesh network modules 40 are in wire or wireless communication with one another as well as with the main control unit 10.

Still referring to FIG. 10, in operation of the system 100, the wire or wireless network 200 does not require that all mesh network modules 40 of the plurality of mesh network modules 40, e.g., in the field, be in direct communication with a host or coordinator module 44. As long as each mesh network module 40 is in wire or wireless communication with another mesh network module 40, all modules 40 of the plurality of mesh network modules 40 in the wire or wireless network 200 become interconnected. The plurality of mesh network modules 40, that are disposed at a distance and/or that are too far from the host or coordinator module 44 to effectively transmit a signal, perform signal-hopping through another mesh network module 40 until the signal is eventually received by the host or coordinator module 44. The signal received by the host or coordinator module 44 comprises the sum of the signals being sent from all mesh network modules 40. For example, a mesh network module 40 that may be associated with a main control unit 10 may comprise a host or coordinator module 44; a mesh network module 40 that may be associated with a pump control unit 20 may comprise an end base; and a mesh network module 40 that may be associated with a gate control unit 30 may comprise a router (not shown). The router transmits signals up and down a communication line of the mesh network to the host or coordinator module 44 while each end base only sends and receives signals. For example, a system 100, comprising a wire or wireless network 200, may comprise three gate control units 30, wherein each gate control unit 30 of the three gate units 30 performs a distinct task or a distinct set of tasks. The host or coordinator module 44 downloads on/off commands for relaying a signal to the pump control unit 20 and uploads a flow rate from the flow meter 22. A mesh network module 40 that is associated with a gate control unit 30 downloads on/off commands for relaying a signal to the motor 36, uploads and transmits data, concerning a water level gleaned from the probe, to the main control unit 10, uploads and transmits data, concerning a water temperature gleaned from the probe, to the main control unit 10, uploads and transmits data, concerning any other water quality measurements, to, or from, any mesh network module 40 to, or from, the main control unit 10. The main control unit 10 uploads data concerning an air temperature from the weather station to the computer 11, uploads the main control unit 10 humidity from the weather station to the computer 11, uploads data concerning wind speed from the weather station to the computer 11, and transmits data to, and from, any other mesh network module 40 to, or from, the computer 11.

Figure 11:
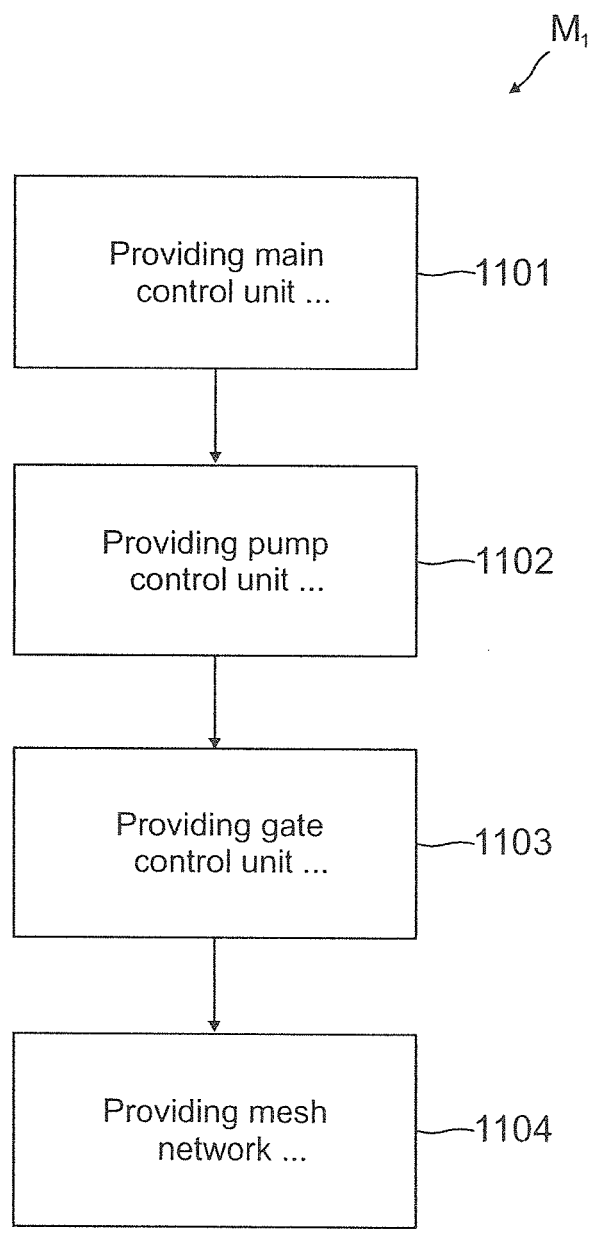
FIG. 11 is a flowchart of a method for fabricating a smart sustainable agricultural/aquacultural system, in accordance with an alternative embodiment of the present invention.

Referring next to FIG. 11, this flowchart illustrates a method $M_1$ of fabricating a smart sustainable agricultural/aquacultural system for use with a plurality of growth reservoirs containing a fluid, in accordance with a general embodiment of the present invention. The method $M_1$ comprises providing a main control unit for wire or wirelessly receiving feedback and wire or wirelessly providing control as indicated by block 1101, providing at least one pump control unit in wire or wireless electronic communication with the main control unit and powered by at least one source, such as an external power source, e.g., the power grid, and a solar power source as indicated by block 1102, and providing at least one gate control unit in wire or wireless electronic communication with the main control unit and powered by at least one source, such as an external power source, e.g., the power grid, and a solar power source as indicated by block 1103, the main control unit comprising a computer, having a wire or wireless node, and at least one element, such as a camera, an atmospheric temperature sensor, and providing an environmental data collection device, the main control unit providing step comprising providing the main control unit 10 as being disposable anywhere within signal transmission range of at least one router associated with each at least one pump control unit and each at least one gate control unit, the pump control unit providing step comprising providing a remote pump as being wire or wirelessly switchable by the main control unit and as being capable of measuring a flow rate of the fluid, and the gate control unit providing step comprising providing a remote gate for controlling flow of the fluid between any two growth reservoirs of the plurality of growth reservoirs, the gate control unit providing step further comprising providing a solar power device and a measurement device, e.g., a probe extending into the growth reservoir, for measuring at least one parameter of the fluid, such as a temperature, a depth, and a fluid quality level. The method $M_1$ further comprises providing a mesh network as indicated by block 1104.

Figure 12:
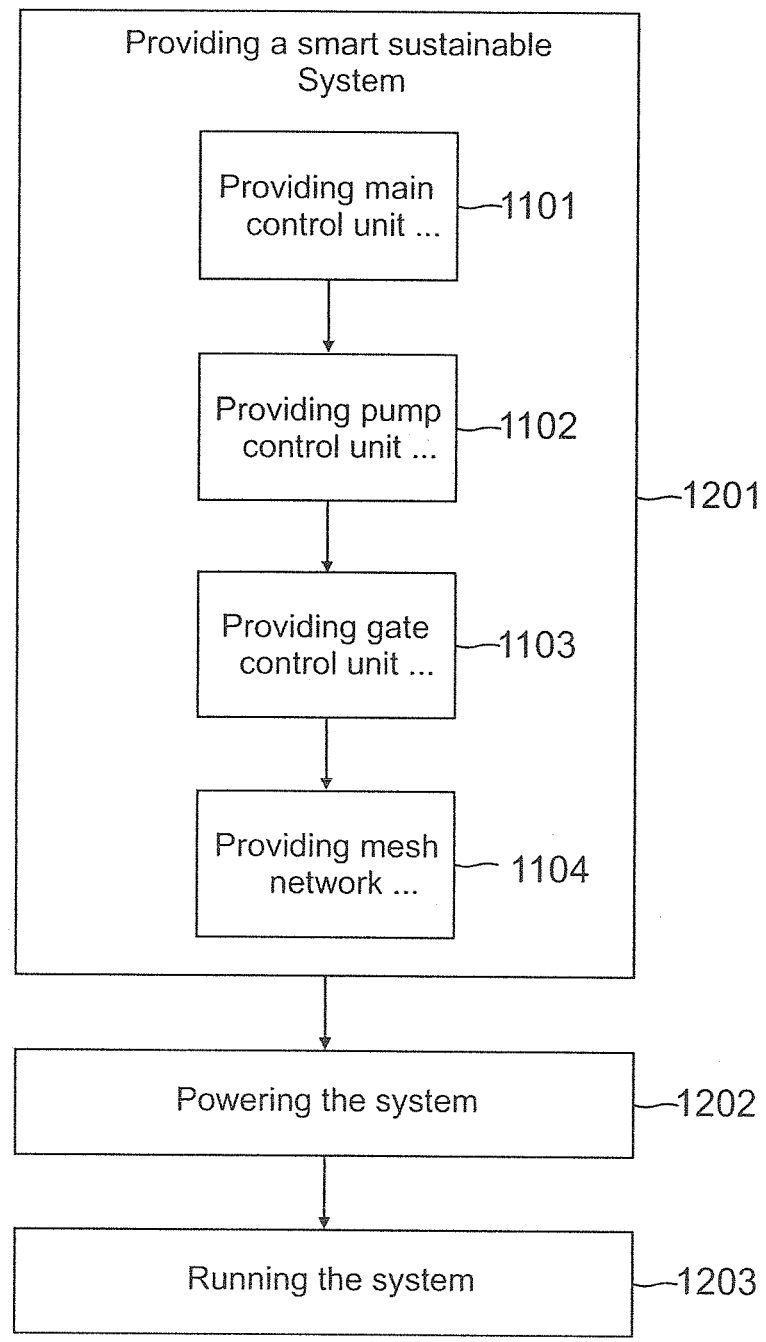
FIG. 12 is a flowchart of a method for using a smart sustainable agricultural/aquacultural system, in accordance with another alternative embodiment of the present invention.

Referring next to FIG. 12, this flowchart illustrates a method $M_2$ of using a smart sustainable agricultural/aquacultural system 100, in accordance with a general embodiment of the present invention. The method $M_2$ comprises providing a smart sustainable agricultural/aquacultural system 100, as indicated by block 1201, the system 100 providing step comprising providing a main control unit for wire or wirelessly receiving feedback and wire or wirelessly providing control as indicated by block 1101, providing at least one pump control unit in wire or wireless electronic communication with the main control unit and powered by at least one source, such as an external power source, e.g., the power grid, and a solar power source as indicated by block 1102, and providing at least one gate control unit in wire or wireless electronic communication with the main control unit and powered by at least one source, such as an external power source, e.g., the power grid, and a solar power source as indicated by block 1103, the main control unit comprising providing a computer, having a wire or wireless node, and providing at least one element, such as a camera, an atmospheric temperature sensor, and providing an environmental data collection device, the main control unit providing step comprising providing the main control unit 10 as being disposable anywhere within signal transmission range of at least one router associated with each at least one pump control unit and each at least one gate control unit, the pump control unit providing step comprising providing a remote pump as being wire or wirelessly switchable by the main control unit and as being capable of measuring a flow rate of the fluid, and the gate control unit providing step comprising providing a remote gate for controlling flow of the fluid between any two growth reservoirs of the plurality of growth reservoirs, the gate control unit providing step further comprising providing a solar power device and a measurement device, e.g., a probe extending into the growth reservoir, for measuring at least one parameter of the fluid, such as a temperature, a depth, and a fluid quality level; powering the system 100 as indicated by block 1202; and running the system 100 as indicated by block 1303. The system providing step, as indicated by block 1201, further comprises providing a mesh network as indicated by block 1104.

Figure 13:
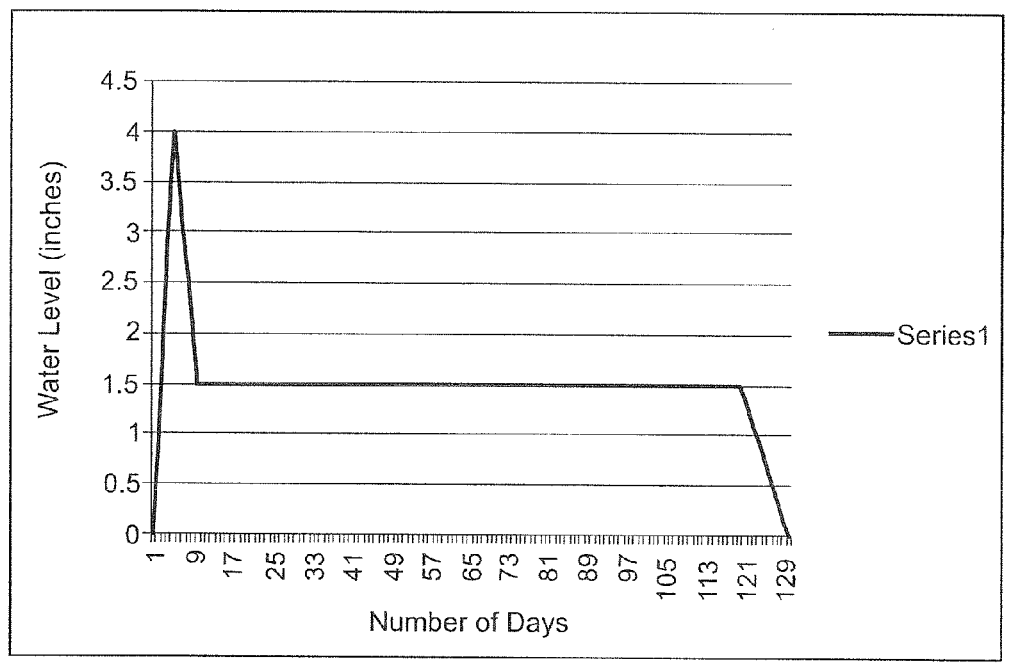
FIG. 13 is a graph showing a growth algorithm as used in a smart sustainable agricultural/aquacultural system, in accordance with an embodiment of the present invention.

Referring next to FIG. 13, this graph illustrates a portion of the growth algorithm 300, as shown and described in reference to FIG. 15, in accordance with an embodiment of the present invention. In particular, this graph shows the water level in (inches) as a function of time (days) into the annual cycle.

Figure 14:
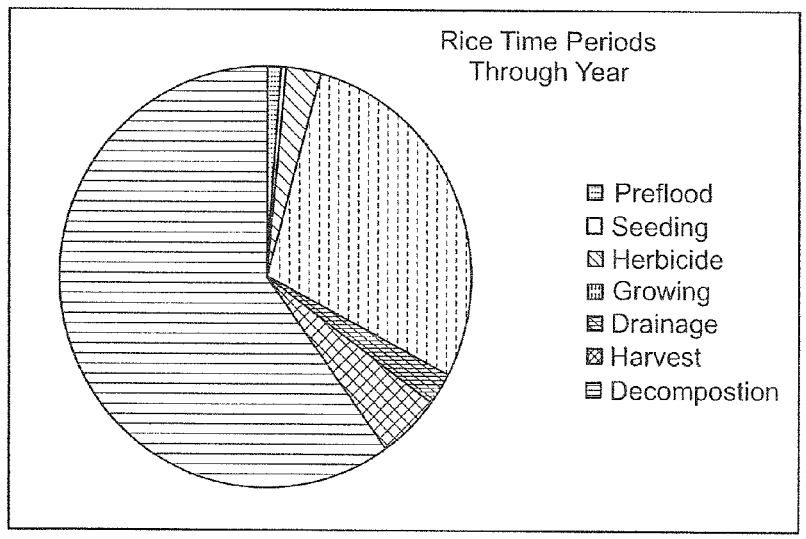
FIG. 14 is a chart showing the proportion of various segments of an annual growth cycle that are defined by a growth algorithm as used in a smart sustainable agricultural/aquacultural system, in accordance with an embodiment of the present invention.

Referring next to FIG. 14, this chart illustrates the proportion of various segments of an annual growth cycle that is defined by the growth algorithm 300, as shown and described in FIG. 15, in accordance with an embodiment of the present invention.

Referring next to FIG. 15, this table illustrates a growth algorithm 300 as used in a smart sustainable agricultural/aquacultural system 100, in accordance with an embodiment of the invention. The algorithm 300 may be used for growing California medium-grain rice, by example only. The algorithm 300 comprises 7 segments in an agricultural application, by example only, which include preflooding, seeding, applying an herbicide, growing, draining, harvesting, and decomposing.

Still referring to FIG. 15, the first segment, preflooding, comprises duration in a range from approximately day 1 to approximately day 4 in an annual cycle approximately 4 days, a pump rate set at a full "on" flow rate position, a water level in a range of approximately 0 inches to approximately 4 inches, a gate vertical displacement of approximately 4 inches, wherein the at least one remote gate 31 has a gate vertical displacement set-point of approximately 4 inches.

Still referring to FIG. 15, the second segment, seeding, comprises a duration in a range of approximately day 5, i.e., the fifth day, in an annual cycle, a pump rate set at an "intermediate" flow rate position, a water level of approximately 4 inches, and a gate vertical displacement of approximately 4 inches, wherein the gate vertical displacement is maintained at approximately 4 inches for facilitating seeding.

Still referring to FIG. 15, the third segment, applying herbicide, comprises a duration in a range of approximately day 6 to approximately day 15 in an annual cycle, a pump rate set at a full "off" flow rate position, a water level in a decreasing range from approximately 4 inches to approximately 1.5 inches, a gate vertical displacement of approximately 4 inches, wherein the gate vertical displacement is maintained at approximately 4 inches, wherein the flow is halted to facilitate the efficacy of the herbicide, and wherein the water level is decreased for facilitating a subsequent growing segment.

Still referring to FIG. 15, the fourth segment, growing, comprises a duration in a range of approximately day 16 to approximately day 120 in an annual cycle, a pump rate set at an "intermediate" flow rate position, a water level of approximately 1.5 inches, and a gate vertical displacement of approximately 1.5 inches, wherein an alarm is triggered if the water level drops below approximately 1.5 inches, wherein the water level is maintained at a level of approximately 1.5 inches, wherein the water level is increased to approximately 3 inches if an air temperature is greater than approximately 100° F. or less than 60° F., thereby adjusting the water level in response to evaporation, wherein the at least one remote gate 31 is raised to its maximum travel if a wind speed exceeds a predetermined threshold.

Still referring to FIG. 15, the fifth segment, draining, comprises a duration in a range from approximately day 121 to approximately day 130 in an annual cycle, a pump rate set at a full "off" flow rate position, a water level in a range of approximately 1.5 inches to approximately 0 inches, a gate vertical displacement of approximately 1.5 inches, wherein the water level decreases from approximately 1.5 inches to approximately 0 inches.

Still referring to FIG. 15, the sixth segment, harvesting, comprises a duration of approximately day 132 to approximately day 150 in an annual cycle, a pump rate set at a full "off" flow rate position, a water level in a range of approximately 0 inches, a gate vertical displacement in a range of approximately 0 inches, wherein the water level is maintained in a range of approximately 0 inches to facilitate drying for subsequent harvesting.

Still referring to FIG. 15, the seventh segment, harvesting, comprises a duration from approximately day 151 to approximately day 365 in an annual cycle, a pump rate set at an "intermediate" flow rate position, a water level in a range of approximately 0 inches to approximately 5 inches, wherein the water level may be optionally maintained in a range of approximately 1 inch to approximately 5 inches during wildlife habitation periods for facilitating crop decomposition.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a system or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, that various changes and modifications in form, material, and fabrication material detail may be made, without departing from the spirit and scope of the invention as set forth in the appended claims, should be readily apparent to those of ordinary skill in the art.

INDUSTRIAL APPLICABILITY

The present invention generally industrially applies to agricultural/aquacultural systems and methods. More specifically, the present invention generally industrially applies to sustainable agricultural/aquacultural systems and methods. Even more specifically, the present invention generally industrially applies to smart sustainable agricultural/aquacultural systems and methods for growing products, such as flooded grain crops and aqueous organisms.

What is claimed:

1. An apparatus for use with a plurality of growth reservoirs containing a fluid, the apparatus comprising:
    a main control unit for receiving feedback and providing control;
    at least one gate control unit in electronic communication with the main control unit, the at least one gate control unit further comprising:
        a remote gate for controlling flow of the fluid between any two growth reservoirs of the plurality of growth reservoirs, the remote gate further comprising a sliding weir gate; and
        a motor coupled with the remote gate for actuating the sliding weir gate;
    wherein the remote gate is disposed into a levee of the at least one growth reservoir of the plurality of growth reservoirs and is actuated in response to at least one instruction transmitted via a corresponding network module for controlling a level of the fluid in the at least one growth reservoir;
    wherein the corresponding network module relays a plurality of on/off commands to the motor and transmits data from at least one probe toward the main control unit;
    wherein the motor actuates a wheel disposed at a top of the remote gate, whereby the sliding weir gate translates in response thereto, and whereby a level of the fluid in the at least one growth reservoir of the plurality of growth reservoirs is adjusted as needed in accordance with the plurality of on/off instructions relayed from the corresponding network module, and
    wherein the motor further actuates the sliding weir gate to compensate for any of the fluid being blown over the remote gate during a windy condition.

* * * * *